(12) United States Patent  
Caviedes et al.

(10) Patent No.: US 7,804,542 B2  
(45) Date of Patent: Sep. 28, 2010

(54) SPATIO-TEMPORAL ADAPTIVE VIDEO DE-INTERLACING FOR PARALLEL PROCESSING

(75) Inventors: Jorge E. Caviedes, Mesa, AZ (US); Steven J. Tu, Phoenix, AZ (US); Satyajit Mohapatra, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1125 days.

(21) Appl. No.: 11/479,530

(22) Filed: Jun. 30, 2006

(65) Prior Publication Data

US 2008/0002055 A1    Jan. 3, 2008

(51) Int. Cl.  
    *H04N 7/01*    (2006.01)
(52) U.S. Cl. ........................... 348/452; 348/448
(58) Field of Classification Search ............. 348/448, 348/451, 452, 458, 459, 443, 441, 446; *H04N 7/01, H04N 11/20*  
See application file for complete search history.

(56) References Cited

U.S. PATENT DOCUMENTS 7,259,794 B2 * 8/2007 Chang et al. ............... 348/452  
2004/0125231 A1 * 7/2004 Song et al. ................. 348/452

* cited by examiner

*Primary Examiner*—Sherrie Hsia  
(74) *Attorney, Agent, or Firm*—Buckley, Maschoff & Talwalkar LLC

(57) ABSTRACT

A method including, in some embodiments, comparing a preceding field and a succeeding field of a video signal for motion at a locus of a current pixel in a current field to be interpolated, in an instance of no motion determining which of a current pixel location in the preceding field and the succeeding field is closer to an estimate of a neighbor pixel and using the result of the determination to decide which of the preceding and succeeding fields to use to interpolate the current pixel based on symmetric spatial neighbors of the current pixel, and in an instance of motion interpolating the current pixel based on symmetric spatial neighbors of the current pixel at a line above and a line below the current pixel in the current frame.

21 Claims, 6 Drawing Sheets

SPATIO-TEMPORAL ADAPTIVE VIDEO DE-INTERLACING FOR PARALLEL PROCESSING

BACKGROUND

An interlaced video signal may be converted into a progressive scan video format for a number of reasons. In some instances it may be desirable to convert an interlaced video signal into a progressive scan format for display on a digital video monitor.

Deinterlacing is the process of creating one complete video frame from a field that contains half of the video raster lines for the video frame. Pixel values for the missing video lines may be computed from neighboring pixels in adjacent lines and fields. If there is no motion between two fields comprising a frame, then the two fields may be simply merged. However, since at least some objects typically move in a video and frames of video occur at different times, a final image may have a blur or other discontinuities. A number of deinterlacing techniques have been proposed. However, previous deinterlacing techniques, including "bob" and "weave" techniques, may still produce video that includes blurs, jagged edges, and other video processing artifacts.

Some deinterlacing techniques may use previous interpolated values in the process of calculating and determining a current pixel value. Such reliance on previously interpolated values requires a sequential (i.e., serial) processing flow.

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

Figure 1:
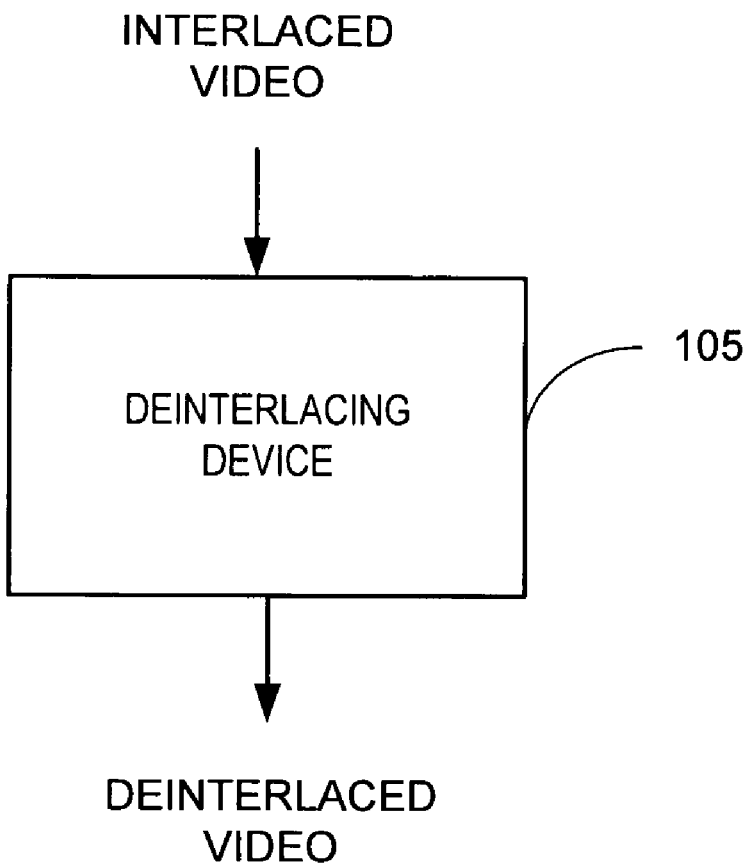
FIG. 1 is an exemplary block diagram, in accordance with some embodiments herein.

FIG. 1 is an exemplary block diagram of an apparatus 100 that performs a deinterlacing process in accordance with some embodiments herein. Apparatus 100 receives a source of interlaced video. Apparatus 100 may include a tuner (not shown), a noise reduction filter (not shown), and other devices, circuitry, and components to condition the input of interlaced video in preparation of deinterlacing the video signal by deinterlacing device 105. Deinterlacing device 105 operates to deinterlace the digital video signal, in accordance with some embodiments herein.

Apparatus 100 may include or be coupled to one or more image signal processing devices (not shown) to perform one or more video processing operations on the de-interlaced video signal provided by deinterlacing device 105. Examples of other processing operations include sharpness enhancement, color correction, gamma correction, etc.

Figure 2:
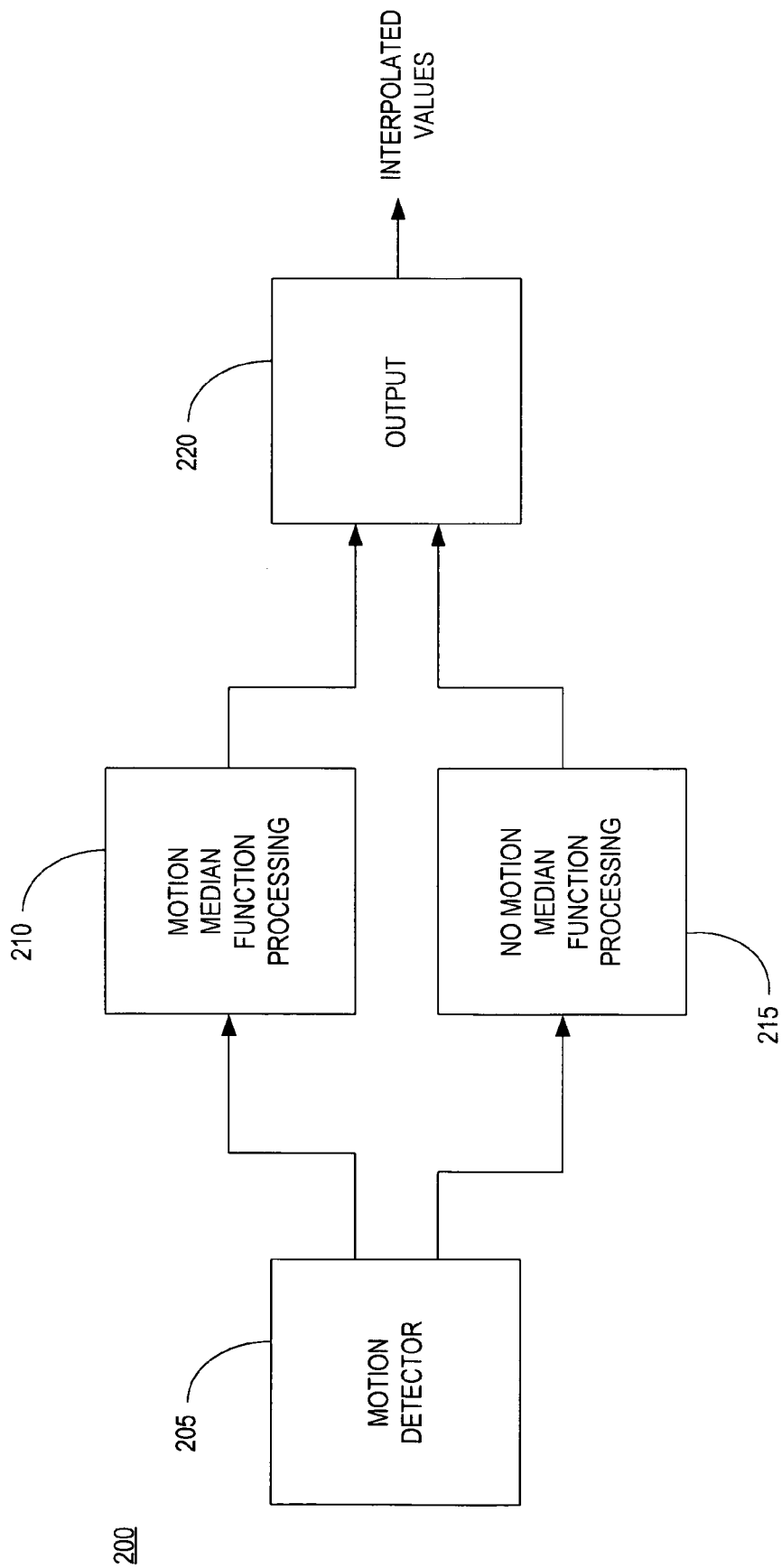
FIG. 2 is an exemplary block diagram, in accordance with some embodiments herein.

FIG. 2 is an exemplary block diagram of an apparatus 200 that illustrates aspects herein. In some embodiments, apparatus 200 is a detailed view of the deinterlacing device 100 of FIG. 1. Motion detector 205 detects motion between two fields, a preceding or previous field and a succeeding or next filed, in a video frame. For example, motion detector 205 may detect a condition of low or no motion between the preceding and succeeding fields at a locus or loci that are relevant to a location of a pixel being interpolated in a current field. The pixel location in the current field is the location for which an interpolation operation is being performed and is also referred to herein as the current pixel.

Motion processing device 215 represents a device or circuit that selects a set(s) of pixel values from one or more of the preceding, current and succeeding fields in response to results of motion detector 205. The set(s) of pixel values selected by motion processing device 210 may include a median operation that provides, as an output, the median value of the input set(s) of pixel values. Motion processing device 210 may be used in the instance an indication of motion is provided by motion detector 205. Motion processing device 215 may represent a device or circuit that selects a set of pixel values from one or more of the preceding, current and succeeding fields in response to results of motion detector 205, and is used in the instance an indication of no motion is provided by motion detector 205. The output of motion processing devices 210, 215 may include the median value of the input set(s) of pixel values and is provided to output stage 220.

In some embodiments, the processing or interpolation of the current pixel to determine the value of the current value may be processed in parallel for "motion" cases and "no motion" cases. This aspect of some of the embodiments herein is illustrated in FIG. 2 by the separation of the by the "motion" and "no motion" processing devices 210 and 215.

Figure 3:
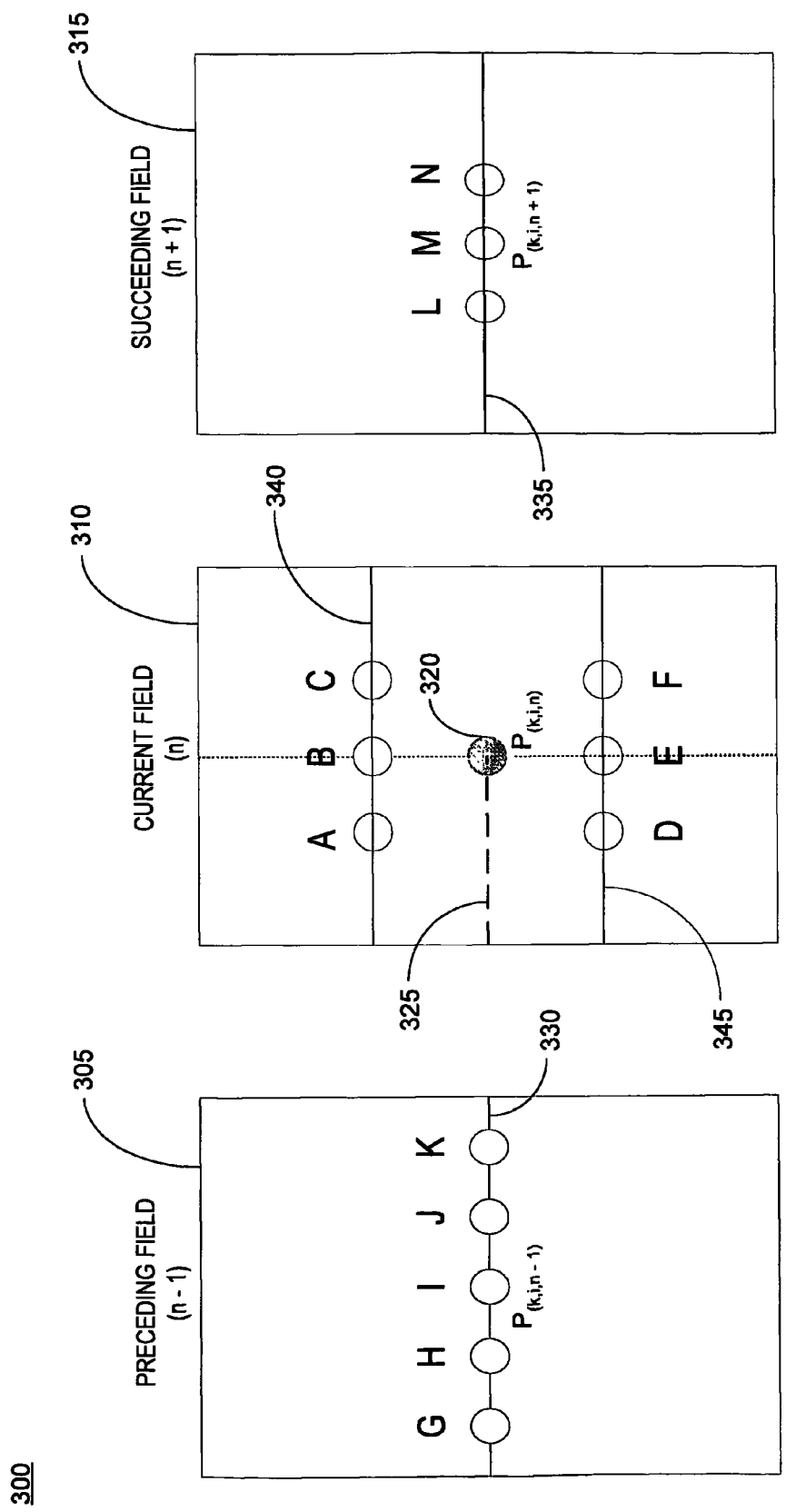
FIG. 3 is a schematic illustration of spatially and temporally neighboring pixels of a current pixel to be interpolated, in accordance with some embodiments herein.

FIG. 3 is an exemplary schematic illustration 300 of spatially and temporally neighboring pixels of a pixel to be interpolated. In particular, schematic illustration 300 includes a preceding field (n–1) 305, a current field (n) 310 that includes the pixel 320 for which the deinterlacing processing is being applied, and succeeding field (n+1) 315. Without loss of generality, it will be assumed that current field (n) 310 is made up of the even lines of a video signal frame and lacks odd lines. Thus, the purpose of the de-interlacing process is to generate interpolated values for the pixels which are to form the missing odd lines in current field (n) 310.

It follows that preceding field (n–1) 305 and succeeding field (n+1) 315 are include odd lines and lack even lines. For simplicity and clarity in the illustration, all but two of the lines of current field (n) 310 are omitted. The two lines 340, 345 of current field (n) 310 that are shown are neighbors of each other, and the dashed line 325 partially shown therebetween represents the intervening odd line that is currently being generated by interpolation. In particular, pixel location 320, pixel $P_{(k,i,n)}$ is the locus of the pixel in line 325 that is currently to be generated by interpolation. Accordingly, pixel location 320 corresponds to the current pixel $P_{(k,i,n)}$ to be interpolated.

For simplicity and clarity in the illustration still, only one line 330 of preceding field (n–1) 305 is shown. Line 330 corresponds in position to the current line 325 of the current field 310. Likewise, the only line of the succeeding field (n+1) 315 shown is line 335 that corresponds in position with the current line 325 of the current field (n) 310.

In some embodiments, up to 14 pixel values of the fields 305, 310, 315 may potentially be considered and/or directly used in generating the interpolated pixel value for the current pixel 320. These 14 pixel values may include three pixels A, B, C from line (k−1) 340 above the current pixel 320 of current field (n) 310, three pixels D, E, F from line (k+1) 345 below the current pixel 320 of current field (n) 310, five pixels from line 330 of preceding field (n−1) 305, and three pixels from line 335 of succeeding field 315.

In some embodiments herein, the determination of the current pixel value may be calculated as follows.

For pixel $P_{k,i,n}$, where i (for i∈[2,pic_width−1]) in line k of field n, is interpolated according to the following:

```
if | P_{k,i,n-1} - P_{k,i,n+1} | >= 10 [Threshold Value that may be varied.]
    P_{k,i,n} = median(P_{k-1,i-1,n}, P_{k-1,i,n}, P_{k-1,i+1,n},
               P_{k+1,i-1,n}, P_{k+1,i,n}, P_{k+1,i+1,n})
Else
    if | P_{k,i,n-1} - nP | < | P_{k,i,n-1} - P_{k+1,i,n} | OR | P_{k,i,n-1} - nP | <
    | P_{k,i,n-1} - P_{k-1,i,n} |
        if | P_{k,i,n-1} - P_{k+1,i,n} | < | P_{k,i,n-1} - P_{k-1,i,n} |
            P_{k,i,n} = median(P_{k,i,n-1}, P_{k+1,i,n}, nP)
        Else
            P_{k,i,n} = median(P_{k,i,n-1}, P_{k-1,i,n}, nP)
        end
    else
        P_{k,i,n} = median(P_{k,i,n-1}, P_{k+1,i,n}, P_{k-1,i,n})
    end
End
```

Thus, it is seen that an initial comparison is made using a threshold value (e.g., 10, but may be selectively varied) to determine if there is motion between pixels in the preceding field 305 and the succeeding filed 310 (e.g., pixels I, M). An absolute value of the comparison greater than or equal to the threshold value is an indication that there is motion while otherwise little or no motion is presumed to have occurred between the pixels. A median operation is performed using certain ones of the pixels as indicated in the sample calculations hereinabove. The median operation (or function) used is based on a symmetrical consideration and use of the fourteen pixels labeled in FIG. 3.

In some embodiments herein, calculations and operations to interpolate pixels in accordance herewith may be done in parallel. Parallel processing may be efficiently performed given the separation of the consideration of pixel values, as indicated in the calculations detailed hereinabove. Also, it is noted that the calculation of a current pixel location $P_{(k,i,n)}$ is not dependant on a previously calculated or interpolated pixel. Thus, pixel considerations (e.g., comparisons) and median calculations may be performed in parallel, in accordance with some embodiments herein. In some embodiments, an implementation of a method, apparatus, and system herein may be facilitated by parallel processors, multi-core processors, and other devices and systems capable of efficient multi-thread processing.

For initial calculations and pixels at a boundary condition (e.g., pixels 1 and pic_width), the value of the interpolated pixel may be calculated as $P_{k,i,n}$=median($P_{k-1,i,n}$, $P_{k+1,i,n}$, $P_{k,i,n-1}$) or it may be calculated using the above formulae by repeating the missing pixels to the left or right.

Regarding the calculation of the current pixel for which a value is being interpolated (current_pixel) and the intermediate value pixel nP used in the calculations herein, the following routine may be used (reference FIG. 3).

```
if abs(I-M) >= Threshold
    % motion case
    current_pixel = median(A,B,C,D,E,F);
else
    % no motion case
    % First compute nP depending on what is the
    % motion for neighbors.
    if (abs(H-L) < Threshold) AND (abs(J-N) < Threshold)
        % Motion is low for
        % both neighbors. nP is the
        % median of the four neighbors (S-T cross pattern).
        nP = median(B,E,I,M);
    else
        if abs(H-L) < Threshold
            % motion is low for neighbor to the left
            nP = round(median([pixA pixD pixH pixG]));
        else
            if abs(pixJ-pixN) < Threshold
                % motion is low for neighbor to the right
                nP = median(C,F,J,K);
            else
                % Neither neighbor has low
                % motion when current pixel has
                % it.
                nP = median(A,B,C,D,E,F);
            end
        end
    end
    current_pixel = median(nP,B E);
    % Alternative Calculation for current_pixel for the no-motion case
    %if abs(nP - I) < abs(B - I) | abs(nP - I) < abs(E - I)
    %    if abs(B - I) <= abs(E - I)
    %        current_pixel = median(nP,B,I);
    %    else
    %        new_pixel = median(nP,E,I);
    %    end
    %else
    %    current_pixel = median(B,E,I);
    %end
end
```

Figure 4:
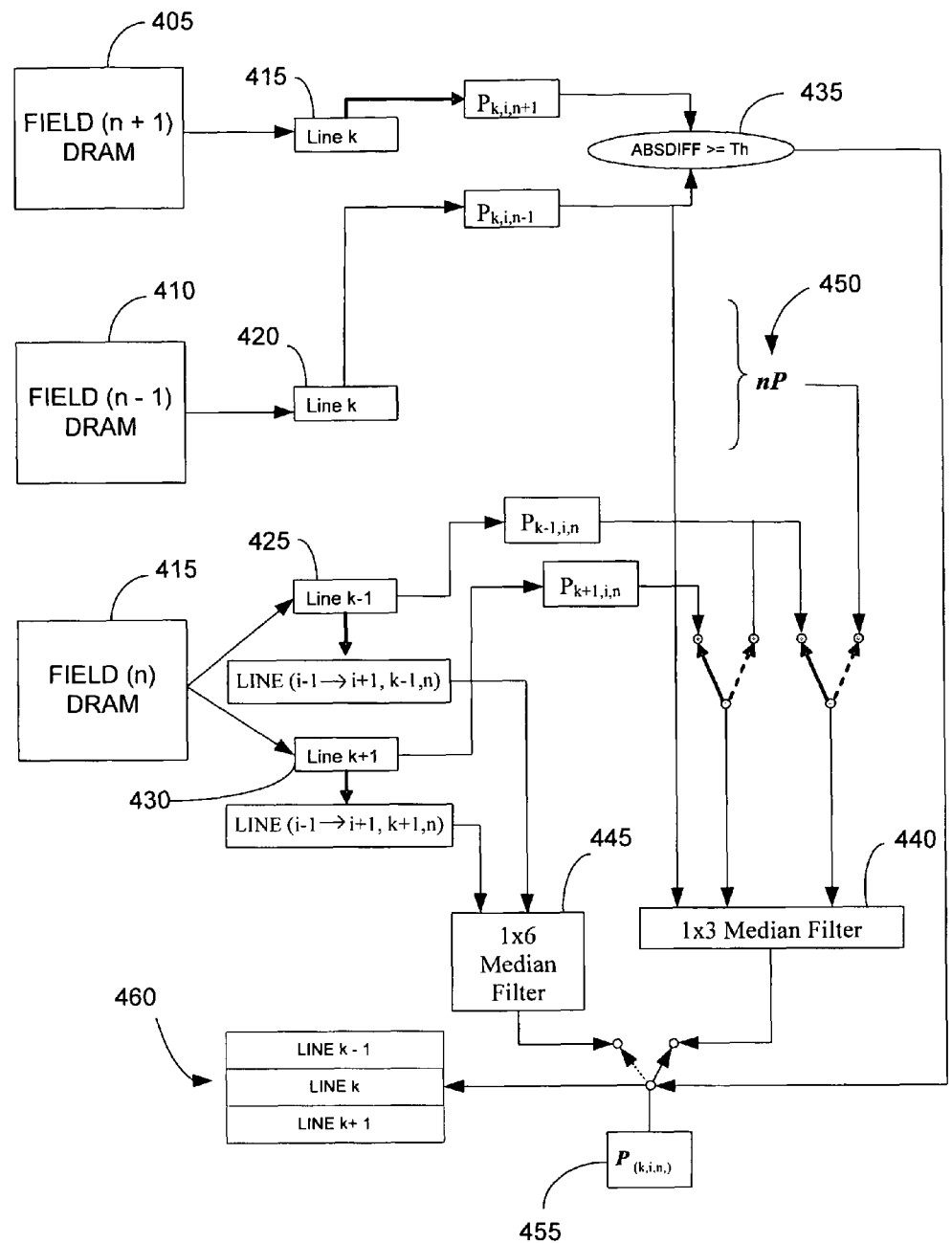
FIG. 4 is an exemplary block diagram, in accordance with some embodiments herein.

FIG. 4 is an exemplary depiction of a block diagram of an apparatus 400 to implement some of the calculations to interpolate a value for a current field, in accordance with some embodiments herein. Apparatus 400 includes memory 405, 410, and 415 to store values a preceding field, a succeeding field, and a current field, respectively. For the preceding field and the succeeding field, line (k) 415 is used. For the current field, lines (k−1) 425, and (k+1) 430 are used. The intermediate value for neighboring pixel nP used in the calculations is shown at 450.

In the instance motion is indicated, a 1×6 median filter operation 445 is used to determine the value of the current pixel 455. In the instance motion is not indicated, a 1×3 median filter operation 440 is used to determine the value of the current pixel 455. The values determined for lines (k), (k+1), and (k−1) may be stored in a memory, cache, or register 460.

Figure 5:
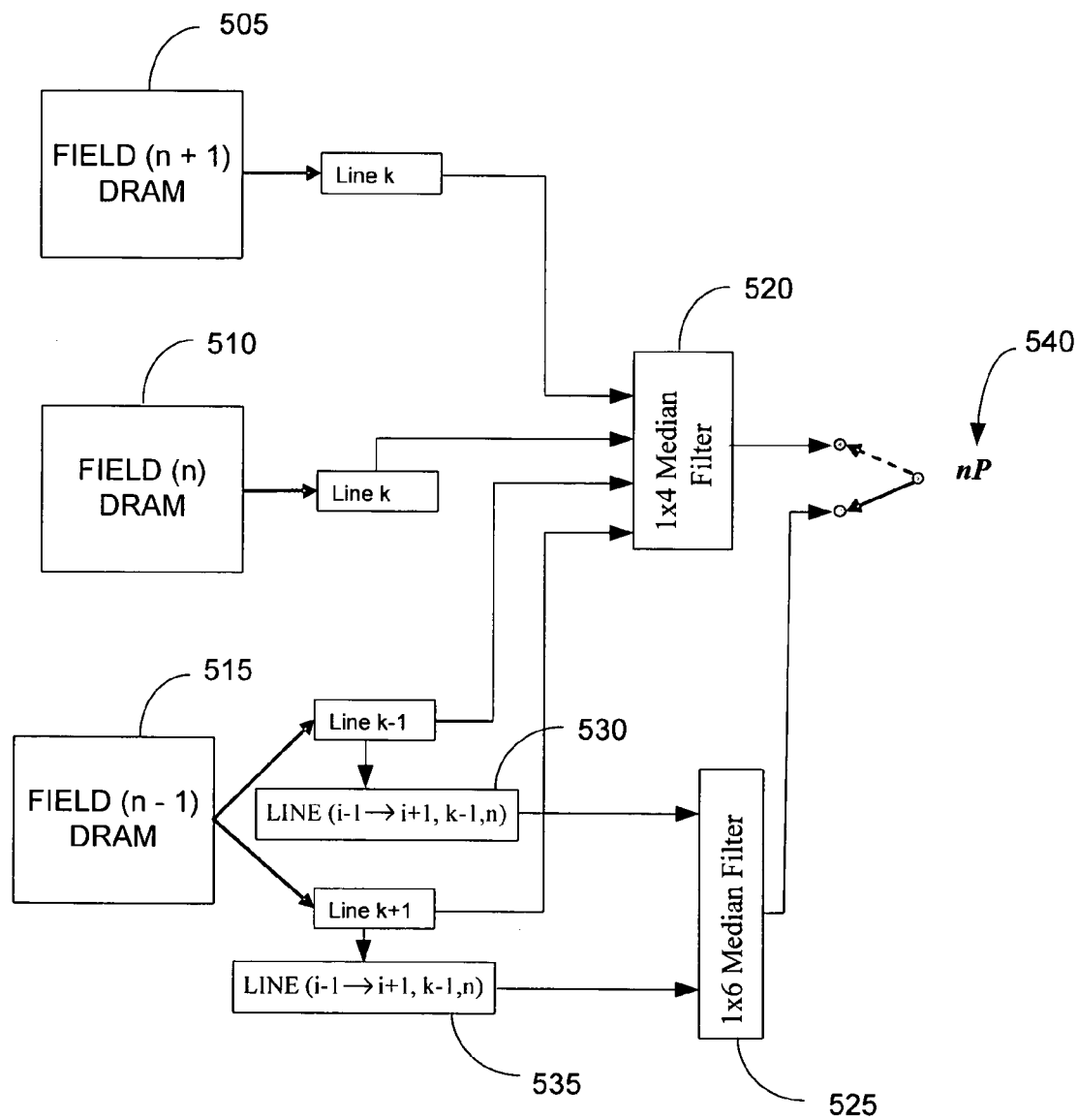
FIG. 5 is an exemplary block diagram, in accordance with some embodiments herein.

FIG. 5 is an exemplary depiction of a block diagram of an apparatus 500 to implement some of the calculations to interpolate a value for the intermediate pixel nP used in the calculation of a current pixel of a current field, in accordance with some embodiments herein. Apparatus 500 includes memory 505, 510, and 515 to store values of a preceding field, a succeeding field, and a current field, respectively. As indicated in the sample calculations included herein for the determination of nP 540, a 1×6 median operation 525 may be used in an instance motion is indicated (e.g., pixels A, B, C, D, E, F) and a 1×4 median operation 520 may be used in an instance little or no motion is indicated (e.g., pixels B, E, I, M or A, F, H, G or C, F, J, K).

In accordance with some embodiments herein, an adaptation to motion and spatial coherency of neighbor pixels to a pixel being interpolated is provided. Some of the embodiments herein consider and use sets of pixels that are symmetrical about the current pixel.

Figure 6:
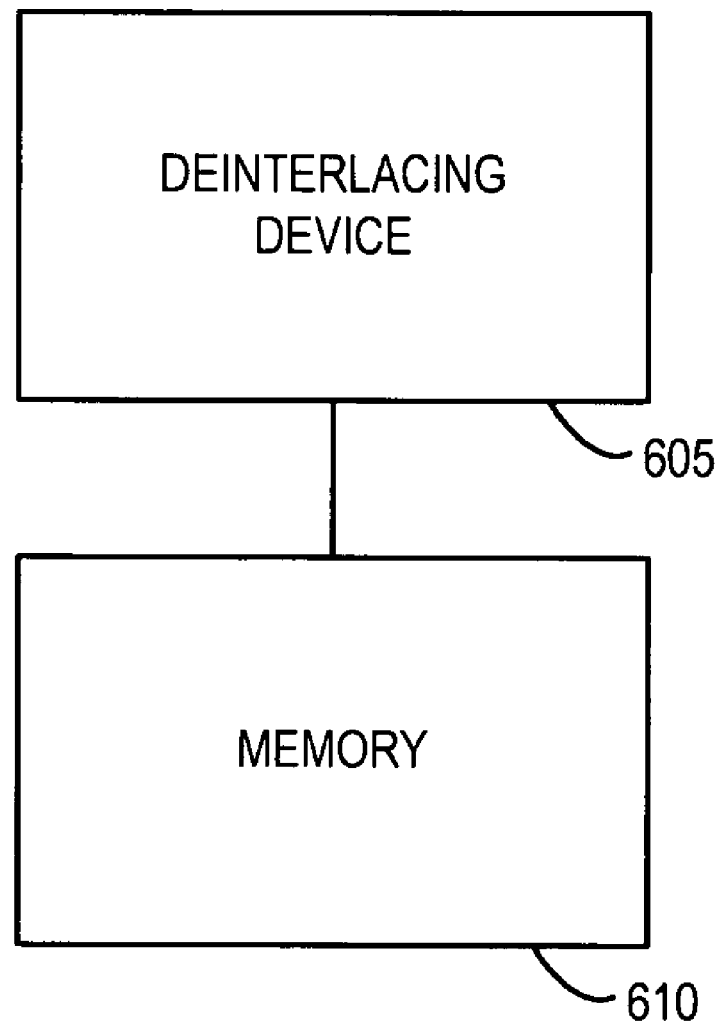
FIG. 6 is an exemplary system in accordance with some embodiments herein.

In some embodiments, the de-interlacing processing herein may be at least part of a processor, system, subsystem, or device. FIG. 6 is an exemplary depiction of a system 600 including a deinterlacing device 605 coupled to a memory 610. Deinterlacing device 605 may be, for example, a general purpose microprocessor, digital signal processor, or other programmable processor. Memory 605 may store software instructions to control the deinterlacing device 605 to perform some of the deinterlacing processes described above, and may serve as working memory and/or input and/or output digital video signal storage memory.

Memory 610 may comprise any type of memory for storing data, including but not limited to a Single Data Rate Random Access Memory, a Double Data Rate Random Access Memory, or a Programmable Read Only Memory.

It should be appreciated that the drawings herein are illustrative of various aspects of the embodiments herein, not exhaustive of the present disclosure.

What is claimed is:

1. A method comprising:
   comparing a preceding field and a succeeding field of a video signal for motion at a locus of a current pixel in a current field to be interpolated;
   in an instance a result of the comparison is less than a predetermined threshold indicative of motion, determining which of a current pixel location in the preceding field and the succeeding field is closer to an estimate of a neighbor pixel and using the result of the determination to decide which of the preceding and succeeding fields to use to interpolate the current pixel based on symmetric temporal neighbors of the current pixel; and
   in an instance the result of the comparison is greater than or equal to the predetermined threshold indicative of motion, interpolating the current pixel based on symmetric spatial neighbors of the current pixel at a line above and a line below the current pixel in the current frame, wherein the calculation of the current pixel is not dependant on a previously calculated or interpolated pixel.

2. The method of claim 1, wherein the result of the comparison is less than the predetermined threshold is an indication that there is substantially no motion between fields in the video signal.

3. The method of claim 1, wherein the result of the comparison is greater than or equal to the predetermined threshold is an indication that there is motion between fields in the video signal.

4. The method of claim 1, further comprising applying a median function to three pixels in the line above and to three pixels in the line below the current pixel in the current frame in the instance the result of the comparison is greater than or equal to the predetermined threshold.

5. The method of claim 1, further comprising applying a median function to three pixels in the preceding field or the succeeding field in the instance the result of the comparison is less than the predetermined threshold.

6. The method of claim 1, further comprising storing the current field, the preceding field, and the succeeding field in a memory.

7. The method of claim 1, further comprising performing the interpolating in the instance the result of a comparison is less than the threshold and performing the interpolating in the instance the result of the comparison is greater than or equal to the threshold in parallel.

8. An article of manufacture having instructions stored thereon that when executed by a machine result in the following:
   comparing a preceding field and a succeeding field of a video signal for motion at a locus of a current pixel in a current field to be interpolated;
   in an instance a result of the comparison is less than a predetermined threshold indicative of motion, determining which of a current pixel location in the preceding field and the succeeding field is closer to an estimate of a neighbor pixel and using a result of the determination to decide which of the preceding and succeeding fields to use to interpolate the current pixel based on symmetric temporal neighbors of the current pixel; and
   in an instance the result of the comparison is greater than or equal to the predetermined threshold indicative of motion, interpolating the current pixel based on symmetric spatial neighbors of the current pixel at a line above and a line below the current pixel in the current frame, wherein the calculation of the current pixel is not dependant on a previously calculated or interpolated pixel.

9. The article of manufacture of claim 8, wherein the result of the comparison is less than the predetermined threshold is an indication that there is substantially no motion between fields in the video signal.

10. The article of manufacture of claim 8, wherein the result of the comparison is greater than or equal to the predetermined threshold is an indication that there is motion between fields in the video signal.

11. The article of manufacture of claim 8, further comprising instructions that when executed by a machine result in the following:
    applying a median function to three pixels in the line above and to three pixels in the line below the current pixel in the current frame in the instance the result of the comparison is greater than or equal to the predetermined threshold.

12. The article of manufacture of claim 8, further comprising instructions that when executed by a machine result in the following:
    applying a median function to three pixels in the preceding field or the succeeding field in the instance the result of the comparison is less than the predetermined threshold.

13. The article of manufacture of claim 8, further comprising instructions that when executed by a machine result in the following:
    storing the current field, the preceding field, and the succeeding field in a memory.

14. The article of manufacture of claim 8, further comprising instructions that when executed by a machine result in the following:
    performing the interpolating in the instance the result of a comparison is less than the threshold and performing the interpolating in the instance the result of the comparison is greater than or equal to the threshold in parallel.

15. An apparatus comprising:
    a deinterlacing circuit operative to:
    compare a preceding field and a succeeding field of a video signal for motion at a locus of a current pixel in a current field to be interpolated;
    in an instance a result of the comparison is less than a predetermined threshold indicative of motion, determine which of a current pixel location in the preceding field and the succeeding field is closer to an estimate of a neighbor pixel and using a result of the determination to decide which of the preceding and succeeding fields to use to interpolate the current pixel based on symmetric temporal neighbors of the current pixel; and in an instance the result of the comparison is greater than or equal to the predetermined threshold indicative of motion, interpolate the current pixel based on symmetric spatial neighbors of the current pixel at a line above and a line below the current pixel in the current frame, wherein the calculation of the current pixel is not dependant on a previously calculated or interpolated pixel.

16. The apparatus of claim 15, wherein the result of the comparison is less than the predetermined threshold is an indication that there is substantially no motion between fields in the video signal.

17. The apparatus of claim 15, wherein the result of the comparison is greater than or equal to the predetermined threshold is an indication that there is motion between fields in the video signal.

18. The apparatus of claim 15, wherein the deinterlacing circuit is operative to apply a median function to three pixels in the line above and to three pixels in the line below the current pixel in the current frame in the instance the result of the comparison is greater than or equal to the predetermined threshold.

19. The apparatus of claim 8, wherein the deinterlacing circuit is operative to apply a median function to three pixels in the preceding field or the succeeding field in the instance the result of the comparison is less than the predetermined threshold.

20. The apparatus of claim 8, wherein the deinterlacing circuit is operative to performing the interpolating in the instance the result of a comparison is less than the threshold and performing the interpolating in the instance the result of the comparison is greater than or equal to the threshold in parallel.

21. An apparatus to de-interlace a current pixel in line n of frame n of a video signal, comprising:

1×4 median filter to receive: (i) information about line k of frame n+1, (ii) information about line k of field n, (iii) information about line k−1 of frame n−1, and (iv) information about line k+1 of field n−1, wherein the 1×4 median filter is to output an intermediate value for a neighboring pixel of the current pixel;

a 1×6 median filter to receive three items of information about line k−1 and three items of information about line k+1 of frame n;

a 1×3 median filter to receive information about line k of frame n−1 along with information about lines k−1, k+1 and the intermediate value of the neighboring pixel output by the 1×4 median filter;

a current pixel value register to selectively receive (i) the output of the 1×6 median filter when motion has been detected in connection with the current pixel, or (ii) the output of the 1×3 median filter when no motion has been detected in connection with the current pixel, wherein the calculation of the current pixel value register is not dependant on a previously calculated or interpolated pixel.

* * * * *